(12) United States Patent
Avery

(10) Patent No.: US 10,597,151 B2
(45) Date of Patent: Mar. 24, 2020

(54) FAILURE TOLERANT ROTOR BLADE PITCH ANGLE CONTROLLING DEVICE

(71) Applicant: John Leonard Avery, Colfax, NC (US)

(72) Inventor: John Leonard Avery, Colfax, NC (US)

(*) Notice: Subject to any disclaimer, the term of this patent is extended or adjusted under 35 U.S.C. 154(b) by 356 days.

(21) Appl. No.: 15/445,939

(22) Filed: Feb. 28, 2017

(65) Prior Publication Data

US 2017/0174341 A1   Jun. 22, 2017

Related U.S. Application Data

(62) Division of application No. 14/742,878, filed on Jun. 18, 2015, now Pat. No. 9,688,396.

(51) Int. Cl.
| | | |
|---|---|---|
| *B64C 27/625* | (2006.01) | |
| *B64C 11/30* | (2006.01) | |
| *B64C 27/605* | (2006.01) | |
| *B64C 29/00* | (2006.01) | |

(52) U.S. Cl.
CPC ............ *B64C 27/625* (2013.01); *B64C 11/30* (2013.01); *B64C 27/605* (2013.01); *B64C 29/0025* (2013.01)

(58) Field of Classification Search
CPC ...... B64C 11/30; B64C 27/605; B64C 27/625
See application file for complete search history.

(56) References Cited

U.S. PATENT DOCUMENTS

| | | |
|---|---|---|
| 1,822,386 A | 9/1931 | Andersen |
| 2,461,435 A | 2/1949 | Neumann |
| 2,567,392 A | 9/1951 | Naught |
| 2,777,649 A | 1/1957 | Williams |
| 2,828,929 A | 4/1958 | Lippisch |
| 2,880,945 A | 4/1959 | Crane |
| 2,955,780 A | 10/1960 | Hubert |
| 2,968,453 A | 1/1961 | Bright |
| 3,184,183 A | 5/1965 | Piasecki |
| 3,246,862 A * | 4/1966 | Celniker ................. B64C 27/54 244/7 R |
| 3,397,852 A | 8/1968 | Katzen |
| 4,022,405 A | 5/1977 | Peterson |
| 4,795,111 A | 1/1989 | Moller |
| 4,796,836 A | 1/1989 | Buchelt |
| 5,064,143 A | 11/1991 | Bucher |
| 5,115,996 A | 5/1992 | Moller |
| 5,295,643 A | 3/1994 | Ebbert |
| 5,419,514 A | 5/1995 | Ducan |
| 5,454,531 A | 10/1995 | Melkuti |
| 6,231,005 B1 * | 5/2001 | Costes ................. B64C 27/605 244/17.25 |
| 6,450,445 B1 | 9/2002 | Moller |
| 6,464,166 B1 | 10/2002 | Yoeli |
| 6,883,748 B2 | 4/2005 | Yoeli |
| 6,892,979 B2 | 5/2005 | Milde |
| 7,032,861 B2 | 4/2006 | Sanders |
| 7,246,769 B2 | 7/2007 | Yoeli |
| 7,249,732 B2 | 7/2007 | Sanders |

(Continued)

*Primary Examiner* — Nicholas McFall

(57) ABSTRACT

A mechanically simple rotor system is a novel mechanism that collectively drives the pitch of the rotor blades by combining the input from three separate servos. Each servo can be controlled by redundant control systems. This configuration reduces total error caused by any one system and allows the continuation of rotor pitch control in the event of one or more servo or system failures.

1 Claim, 3 Drawing Sheets

(56) References Cited

U.S. PATENT DOCUMENTS

| | | | |
|---|---|---|---|
| 7,857,253 B2 | 12/2010 | Yoeli | |
| 8,651,432 B2 | 2/2014 | De Roche | |
| 8,733,690 B2 | 5/2014 | Bevirt | |
| 8,931,729 B2 | 1/2015 | Abde Qader Alzu-Bi | |
| 2009/0084907 A1* | 4/2009 | Yoeli | B64C 15/02 244/23 R |
| 2009/0224095 A1* | 9/2009 | Cox | B64C 27/20 244/17.23 |
| 2010/0270419 A1* | 10/2010 | Yoeli | B64C 29/0025 244/12.1 |
| 2011/0042509 A1* | 2/2011 | Bevirt | B64C 29/0033 244/12.4 |
| 2011/0042510 A1* | 2/2011 | Bevirt | B64C 29/0033 244/12.4 |
| 2011/0049306 A1* | 3/2011 | Yoeli | B64C 29/0025 244/23 A |
| 2011/0155859 A1* | 6/2011 | Vetters | B64C 29/0025 244/23 A |
| 2011/0168834 A1* | 7/2011 | Yoeli | B64C 1/1415 244/12.3 |
| 2013/0105635 A1* | 5/2013 | Alzu'bi | B64C 39/024 244/23 A |

\* cited by examiner

FAILURE TOLERANT ROTOR BLADE PITCH ANGLE CONTROLLING DEVICE

CROSS-REFERENCE TO RELATED APPLICATIONS

This is a division of application Ser. No. 14/742,878, filed 18 Jun. 2015, with title "DUCTED OBLIQUE-ROTOR VTOL VEHICLE" and naming John Leonard Avery as inventor, the entire content of which is hereby incorporated herein by reference.

FEDERALLY SPONSORED RESEARCH

Not Applicable

SEQUENCE LISTING OR PROGRAM

Not Applicable

BACKGROUND OF THE INVENTION

Field of Invention

The present invention relates generally to a rotor blade pitch control device and, more particularly, to a rotor blade pitch control system that utilizes a plurality of actuators for failure tolerance and system error mitigation.

Prior Art

Flying machines that can takeoff vertically and hover have been around for over a century. To date, the most practical configuration of these machines is the helicopter. Although there have been variations of the helicopter design, all have similar mechanisms. The reasons for the success of the helicopter is the light-weight structural configuration of the rotor system that allows for a low disc loading and the ability to auto-rotate in the event of engine failure.

The helicopter has several limitations, however, including speed and range, because of the rotor's direct exposure to the freestream airflow. Another limitation of the helicopter is the inherent danger of exposed main and tail rotor blades to ground personnel. Finally, noise and airframe vibration is synonymous with the helicopter.

Humans have been trying to solve these problems and create a more esthetically pleasing form of the helicopter ever since its creation. An early design conceptualized a propeller housed in a shroud and used a minimum number of vanes for control. See U.S. Pat. No. 1,822,386 (Andersen). Other early designs tried to encapsulate a large rotor with vanes, above and below, to direct flow and provide control. See U.S. Pat. No. 2,777,649 (Williams). Later, single and multi-rotor platforms were studied. See U.S. Pat. No. 2,955,780 (Hulbert). Winged, tandem-rotor platforms were also proposed. See U.S. Pat. No. 2,968,453 (Bright). Piasecki Aircraft Corporation built several prototypes of the wingless, tandem-rotor platforms. They were controlled by using both vanes and differentially adjusting the collective pitch control between each rotor. See U.S. Pat. No. 3,184,183 (Piasecki). More recent designs of the VTOL aircraft have been around for decades without becoming practical. An example of this is the Moller Skycar. The design requires very high power to weight ratios and complex mechanical control systems. See U.S. Pat. No. 5,115,996 (Moller).

Work has continued on the tandem rotor platform vehicle in recent times. These configurations are proposed with wings and without, with gamboling rotors and a multitude of vane configurations. See U.S. Pat. No. 6,464,166 (Yoeli), U.S. Pat. No. 6,883,748 (Yoeli), U.S. Pat. No. 6,892,979 (Milde), U.S. Pat. No. 7,246,769 (Yoeli), U.S. Pat. No. 7,249,732 (Sanders), U.S. Pat. No. 7,857,253 (Yoeli), U.S. Pat. No. 8,651,432 (De Roche) and US. Pat. Appn. Nos. 2009/0084907 (Yoeli), 2010/0270419 (Yoeli), 2011/0049306 (Yoeli), 2011/0168834 (Yoeli). These concepts may have merit for short range and endurance, however, the design is inherently inefficient for both lifting capacity and horizontal flight.

OBJECTS AND ADVANTAGES

Point-to-point transportation of products and people have been dreamt about for centuries. The idea of stepping into a personal flying machine that can take someone directly to where they want to go, all while watching the world from above, is alluring. Recently, corporations have even set goals to autonomously deliver packages to individual residence from the air. The present state of the art in air vehicles has prohibited either of these visions from realization. There is currently inadequate infrastructure to safely direct the number of flying machines required for mass movements of everyday people and goods. There is also a lack of viable aircraft that can safely be flown from or into residential or commercial locations, much less, ones that can be done at a price people can afford. A flying machine that will someday make point-to-point transportation a reality will be controlled autonomously. These machines must be able to land in a multitude of locations across a densely populated area since current airports do not have the areal capacity to park all the vehicles of those visiting and inhabiting a city. Flight paths of vehicles will be in close proximity and precise navigation and control will be required to safely integrate into the congested airspace in both visual and instrument meteorological conditions.

Flying machines that takeoff and land vertically have evolved into two districted groups, those with relatively small, enclosed rotors or lift nozzles, such as the Joint Strike Fighter or Harrier, and those with large rotors, such as helicopters. The first group has very high disk loading or nozzle pressures and requires large power-to-weight ratios to achieve vertical flight. They need state-of-the-art, expensive, fuel inefficient engines that produce noise levels much beyond what are acceptable in residential or business communities. The second group of vehicles, the helicopter, can fly vertically on much lower-power and use relatively efficient engines; however, they require trained personnel to be in their vicinity because of the dangers from exposed rotors. Helicopters also have inherent limited range and speed capability. Hybrid vehicles, such as the Osprey or Eagle Eye, using tilt-rotor configurations, have been introduced and used in service but this configuration requires very expensive turbine engines and complex mechanical systems for them to fly safely. And, they still suffer from the dangers of exposed rotors.

Electric, multi-rotor, flying vehicles have recently been introduced to the public for entertainment or used as a photography platform. These machines have only become available because of the miniaturization of electronic components and improved battery technology. They can be made with propulsion redundancy if enough rotors are employed; however, this adds complexity and weight.

A simple mechanical rotor system using inputs from a plurality of servos is presented. This novel rotor pitch control mechanism allows for a simple rotor configuration while maintaining triple redundant collective control. This rotor pitch control device has use in fields such as aerospace, marine, wind energy and other commercial or consumer products.

SUMMARY OF INVENTION

The present invention is a mechanically simple rotor system with a novel mechanism that collectively drives the pitch of rotor blades by combining the input from a plurality of servos. Each servo can be controlled by parallel and redundant control systems.

The use of the multiple actuators in the rotor pitch control system in the present invention lends itself to control redundancy. This allows for the use of less reliable, commercial servos and actuators, thereby, improving safety at a lower cost. This configuration could also have important implications in military intelligence gathering, weapons delivery, marine propulsion, wind turbines and other commercial and industrial applications.

Rotor pitch control is achieved on the preferred configuration using three separate irreversible servos that are connected to a common plane that pivots about and translates along the rotor axis. The actual pitch input is that of the relative translation of a point created by the intersection of the servo attachments and the rotor spin axis. Each blade's pitch is adjusted in unison in proportion to a kind of averaging of the three input servos. This configuration allows for one or two control systems or actuator failures while still maintaining pitch controllability.

These and other features and advantages of the present invention will be readily apparent to those of skill in the art from a review of the following detailed description along with the accompanying drawing figures.

BRIEF DESCRIPTION OF THE DRAWINGS

The preferred embodiment of the present invention is a mechanical voting pitch control system that allows averaging from three irreversible servos 89 or actuator inputs to drive rotor blade 41 pitch positions collectively and in unison. (FIG. 1). In the event one or more servos 89 or control systems stop functioning or function improperly, the other servo or servos can drive the pitch system. FIG. 1 depicts a side view of the present invention, showing only two rotor blades and associated linkages for clarity. The preferred embodiment has six rotor blades 41 but the invention may have more or less. Rotor blades 41 and control arms 103 have pitch positions controlled by movement of three irreversible servos 89 which are each connected to stationary structure 90 through a spherical bearing 98. The servos 89 are also connected to a swivel plate 93 through spherical bearings 98 that pivots around a spherical bearing 86 that is part of or attached to the slider 101. The spherical bearing 86 may bear against the swivel plate 93 directly or bear against a race that connects to the swivel plate 93. The three servo connections define a plane that determines the position of the slider 101 along the rotor shaft 85. The swivel plate 93 and the slider 101 do not rotate with the rotor shaft. Bearings 107 allow rotational isolation of the rotor shaft 85 and the slider 101 while still maintaining lateral continuity between both. The bearings 107 do not restrict the slider 101 from translating along the rotor shaft 85. The slider 101 is connected to a rotating collective fitting 91 through a rotational bearing 105 that is captured by a retaining clip 97 that resides in a machined groove. The rotational bearing 105 isolates the rotational movement of the collective fitting 91 to that of the slider 101 while still maintaining lateral and axial positioning. The collective fitting 91 translates along the rotor shaft and moves each rotor link 87 the same axial distance the slider 101 moves. Each rotor link 87 is attached to a blade pitch arm 103, which is rigidly attached to a blade. The rotor pitch arms 103 convert linear motion of the links 87 to rotational motion of the blade 41 about each blade pitch axis. A set of links 99 is attached between the collective fitting 91 and the rotor hub 43 through a series of hinges 94. These maintain rotational position between the rotor head 43 and collective fitting 91 without impeding relative axial movement along the rotor shaft 85. Similarly, another set of links 109 attaches the swivel plate 93 to stationary structure 90 on a vehicle or other machine. These links 109 keep the swivel plate 93 from rotating with the rotor shaft 85 while still allowing the swivel plate to pivot freely about its spherical bearing center. A spherical bearing 92 is required to attach the link 109 to the swivel plate 93 to allow independent rotation.

Figure 1:
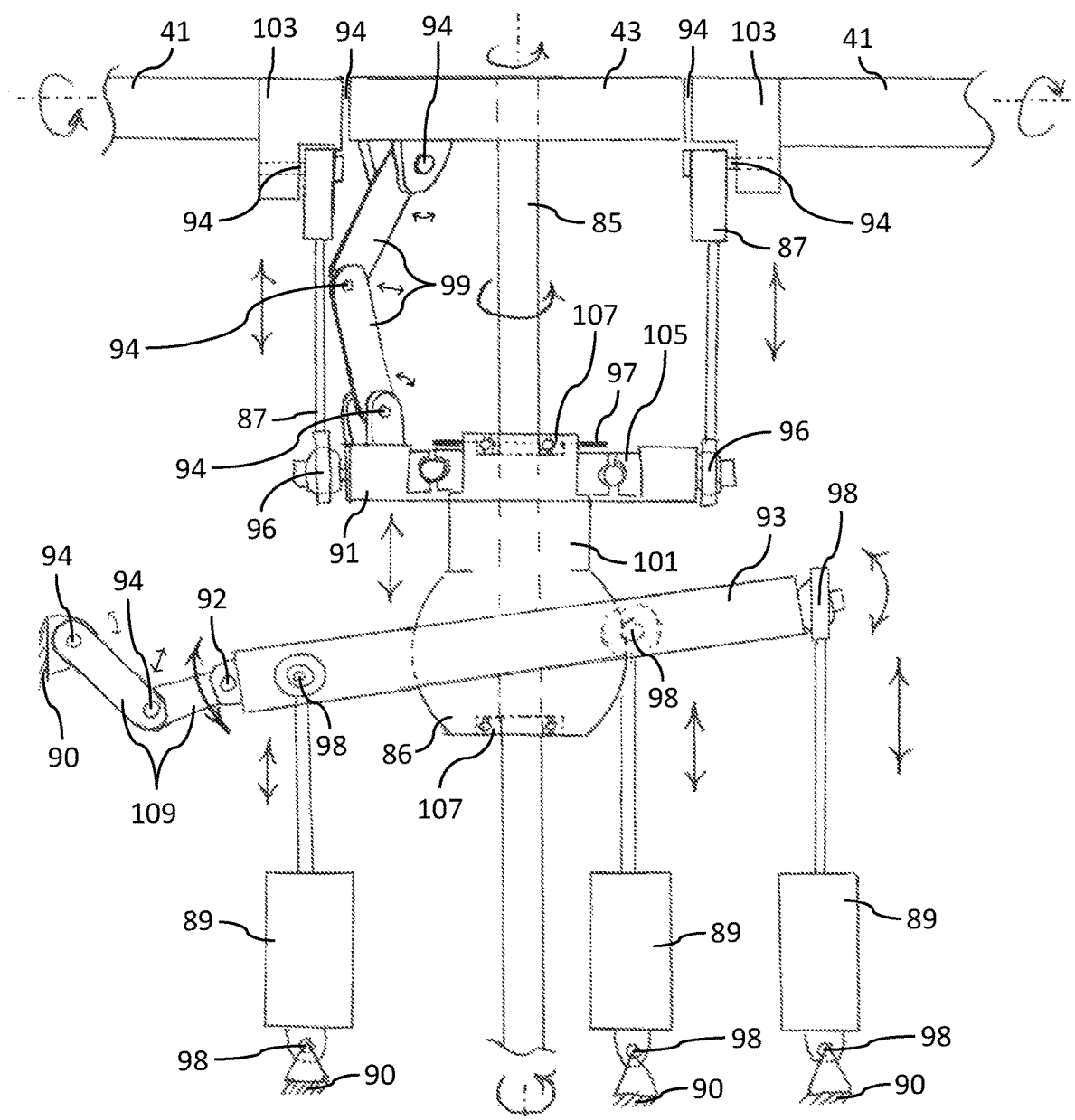
FIG. 1 is a side view of the voting rotor pitch control system—two-bladed rotor shown.
Figure 2:
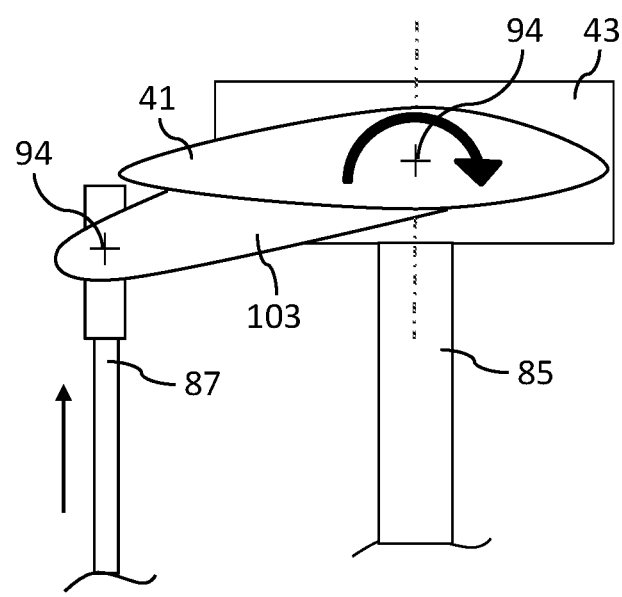
FIG. 2 is a enlarged view of the rotor hub, rotor blade, blade pitch arm and rotor link.
Figure 3:
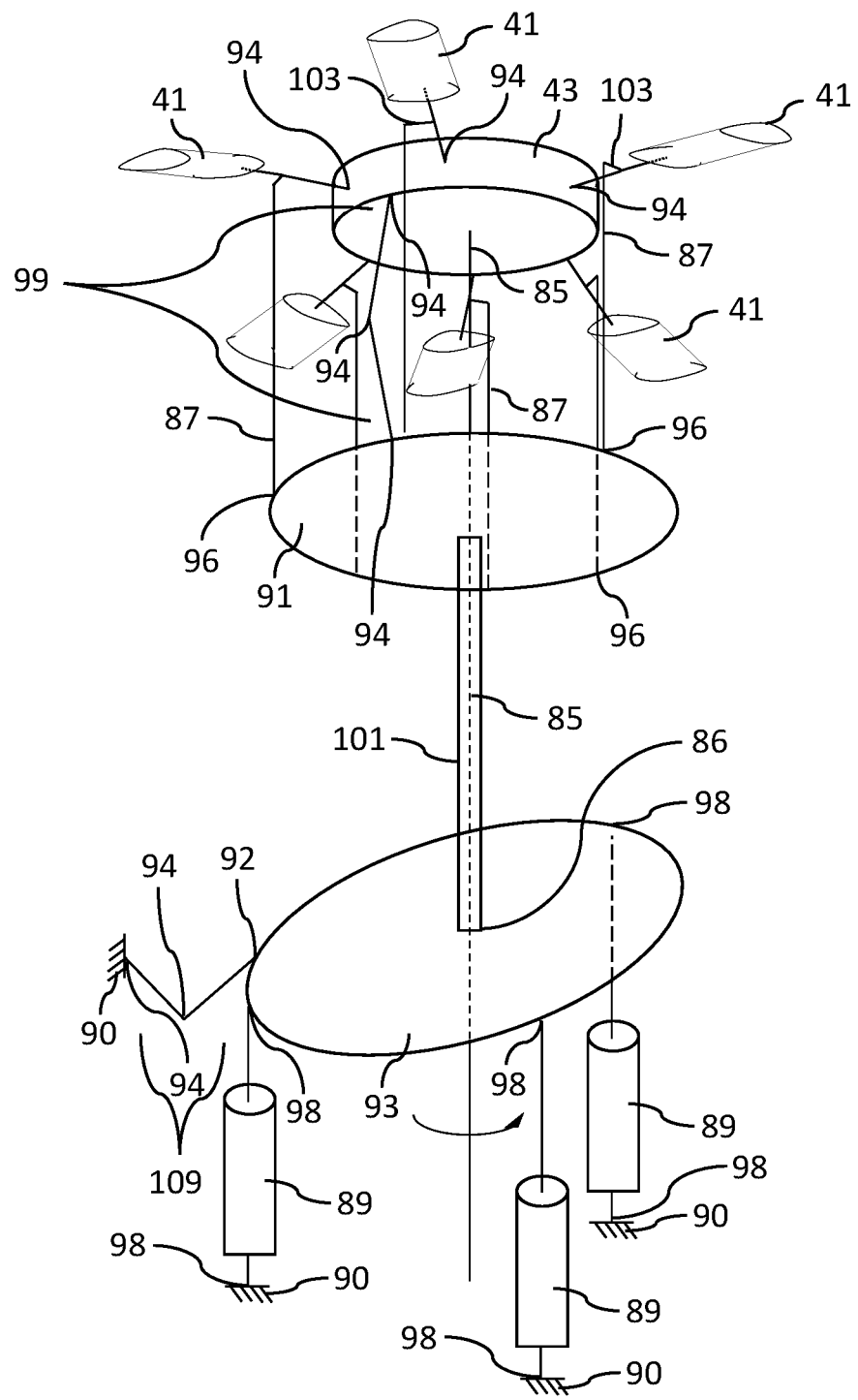
FIG. 3 is a perspective view of the voting rotor pitch control system schematic.

Other embodiments of the present invention may control the rotors pitch in a similar manner using different geometry and components but maintaining the ability to mechanically vote using a swivel plate 93 and multiple servos or actuators. The preferred embodiment uses three irreversible actuators to determine the swivel plate 93 orientation and position. Other embodiments of the present invention may use more than three reversible servos or actuators to vote and provide control redundancy to the rotor pitch system. A reversible servo or actuator is one that does not maintain position when power or commanded signal is lost. Still another embodiment of this invention is a system that contains multiple parallel pitch mechanisms that controls pairs of rotor blades attached opposite to each other on the rotor hub 43. Each system is driven by a servo 89, actuator or sets of either to independently control the pitch of pairs of rotor blades. For instants, a rotor hub containing six rotor blades could be controlled by three independent pitch mechanisms. Loads from the paired blades would be balanced across the rotor hub 43 even if they were commanded at different pitch angles from the other blade sets, or if they were inoperative.

The forgoing is considered as illustrative only to the principal of the invention. Further, since numerous changes and modification will occur to those skilled in the art, it is not desired to limit the invention to the exact construction and operation shown and described above, and accordingly, all suitable modifications and equivalents may be resorted to falling within the scope of the invention.

What is claimed is:

1. A failure tolerant rotor blade collective pitch angle controlling device, comprising:
   a. a plurality of rotor blades, each with a pitch axis of rotation along its length;
   b. a rotor hub that interconnects said plurality of rotor blades and hinges each rotor blade of said plurality of rotor blades about said pitch axis of rotation;
   c. a plurality of rotor blade pitch arms, each connecting to a rotor blade of the plurality of rotor blades on one end, to allow transmission of moments to control blade pitch, and each other end extends away from each rotor blade of the plurality of rotor blades of said pitch axis of rotation;

d. a rotor shaft that spins and transmits torque, gyroscopic moments and thrust forces along a rotor spin axis;
e. a rotating collective fitting of rigid material that spins with and translates along said rotor shaft spin axis to uniformly transmit pitch commands to all rotor blades of said plurality of rotor blades, simultaneously;
a plurality of rotor links, each that connect the other end of each blade pitch arm of said plurality of pitch arms, through a hinge or spherical bearing, to said rotating collective fitting, also through a hinge or spherical bearing;
g. said plurality of rotor links rotate with said rotor hub, said plurality of rotor blades, said plurality of rotor pitch arms and said rotor shaft about the said rotor shaft spin axis;
h. a slider that one end connects to said rotating collective fitting through a rotational bearing and translates along said rotor shaft spin axis to control pitch of said plurality of rotor blades but does not rotate;
i. a swivel plate of rigid material that connects to said slider through a spherical joint to allow relative changes in orientation between the said swivel plate and said slider;
j. three irreversible actuators, each connected to a stationary structure on one end and to said swivel plate on each other end, to control and adjust said swivel plate orientation and position by modifying the length of each actuator of said three irreversible actuators, thereby, uniformly adjusting the pitch of all said plurality of rotor blades simultaneously by averaging the input of each said three irreversible actuators, even if one or more actuators of said three irreversible actuators fail.

* * * * *